US012101450B2

United States Patent
Hecker et al.

(10) Patent No.: US 12,101,450 B2
(45) Date of Patent: Sep. 24, 2024

(54) METHOD OF GENERATING A SECURE IMAGE

(71) Applicant: HID Global CID SAS, Suresnes (FR)

(72) Inventors: Hermann Hecker, Berlin (DE); Frantz Mercier, Hollister, CA (US)

(73) Assignee: ASSA ABLOY AB, Stockholm (SE)

( * ) Notice: Subject to any disclaimer, the term of this patent is extended or adjusted under 35 U.S.C. 154(b) by 421 days.

(21) Appl. No.: 17/597,899

(22) PCT Filed: Nov. 20, 2019

(86) PCT No.: PCT/EP2019/081868
§ 371 (c)(1),
(2) Date: Jan. 28, 2022

(87) PCT Pub. No.: WO2021/098955
PCT Pub. Date: May 27, 2021

(65) Prior Publication Data
US 2022/0272225 A1    Aug. 25, 2022

(51) Int. Cl.
*H04N 1/32* (2006.01)
*B42D 25/333* (2014.01)
*G06T 1/00* (2006.01)

(52) U.S. Cl.
CPC ......... *H04N 1/3232* (2013.01); *B42D 25/333* (2014.10); *G06T 1/0078* (2013.01); *G06T 2201/0061* (2013.01)

(58) Field of Classification Search
CPC .. H04N 1/3232; H04N 1/4057; H04N 1/4055; B42D 25/333; G06T 1/0078; G06T 2201/0061
See application file for complete search history.

(56) References Cited

U.S. PATENT DOCUMENTS

| 7,054,038 | B1 | 5/2006 | Ostromoukhov et al. |
| 2007/0236736 | A1 | 10/2007 | Tai et al. |

(Continued)

FOREIGN PATENT DOCUMENTS

| EP | 0580151 A2 | 1/1994 |
| EP | 2963908 | 1/2016 |
| WO | WO-2021098955 A1 | 5/2021 |

OTHER PUBLICATIONS

"International Application Serial No. PCT/EP2019/081868, International Search Report mailed Jul. 29, 2020", 3 pgs.

(Continued)

*Primary Examiner* — Christopher Wait

(74) *Attorney, Agent, or Firm* — Schwegman Lundberg & Woessner, P.A.

(57) ABSTRACT

A secure image for a security document is generated by performing a rasterization process for each of a plurality of mono-color base images using a plurality of different threshold functions. For each base image, the plurality of threshold functions cover different intensity regions and result in a complex rasterization pattern depending on the intensity of the input image. The resulting binary images obtained by the rasterization process are combined using offset printing with fluorescent inks of different colors, to result in a multi-color fluorescent output image including a plurality of different complex rasterization patterns.

20 Claims, 7 Drawing Sheets

(56) References Cited

U.S. PATENT DOCUMENTS

2008/0259400 A1 10/2008 Hersch et al.
2017/0109857 A1* 4/2017 Chen ................... G06T 1/0021

OTHER PUBLICATIONS

"International Application Serial No. PCT/EP2019/081868, Written Opinion mailed Jul. 29, 2020", 6 pgs.

"European Application Serial No. 19809025.0, Response Filed Aug. 25, 2022 to Communication Pursuant to Rules 161(1) and 162 EPC mailed Jun. 1, 2022", 7 pages.

"European Application Serial No. 19809025.0, Communication Pursuant to Article 94(3) EPC mailed Sep. 29, 2023", 6 pages.

"European Application Serial No. 19809025.0, Indication of deficiencies in a request under Rule 22 EPC mailed Dec. 5, 2023", 2 pages.

"European Application Serial No. 19809025.0, Response Filed Jan. 23, 2024 to Communication Pursuant to Article 94(3) EPC mailed Sep. 29, 2023", 5 pages.

* cited by examiner $T_1(x, y)$ $T_2(x, y)$

METHOD OF GENERATING A SECURE IMAGE

CROSS-REFERENCE TO RELATED APPLICATION(S)

The present application is a national stage application under 35 U.S.C. § 371 of PCT Application No. PCT/EP2019/081868, titled "Method of Generating a Secure Image." filed Nov. 20, 2019, which is hereby incorporated by reference herein in its entirety.

TECHNICAL FIELD

The present disclosure generally relates to a method of generating a secure image for a security document, for example, an ID card or a passport.

BACKGROUND

Generally, trichromatic (i.e., full color) fluorescent images are proposed as security features in passports and ID cards. Although trichromatic fluorescent images have a beautiful appearance, they are not widely used in today's security documents. One reason is that such features are based on halftone rasterization, which is a standard technique in most of today's image printing. Software for halftone rasterization is freely available. Further, commercially available hardware such as office printers and the like also use halftone rasterization.

As a consequence, the technology of halftone rasterization is publically available to everyone, and therefore not deemed secure. This is the reason why trichromatic fluorescent images used today do not exhibit the level of security that is necessary to satisfy the requirements associated with use of the same in security documents such as passports and ID cards.

US 2008/0259400 A1 discloses a method of creating fluorescent color images visible under UV light. It relies on new colorants that can be achieved by superposing ink dots, possibly at a reduced size, in order to avoid quenching effects. It also relies on juxtaposed halftoning, which ensures that colorants are printed side by side and do therefore not overlap. However, the downside of juxtaposed halftoning is a reduced spatial resolution, resulting in a lack of representation of image details, which again is not suitable for small images used, for example, in ID card and passport applications.

U.S. Pat. No. 7,054,038 B1 provides a method and an apparatus for the reproduction of color images by multi-color dithering. The objective is to achieve a rasterization that can be used for printing color images with freely chosen standard or non-standard inks. The precondition for this wide field of applications is to avoid any interaction between the different inks. Therefore, the method is designed to create juxtaposed dots in an automated way. Again, the downside is that a strictly juxtaposed rasterization impacts the resolution of the resulting image. In addition, a uniform rasterization matrix is used across the entire image, which can be easily reproduced and therefore does not provide the level of complexity required for secure documents.

The present disclosure is directed, at least in part, to improving or overcoming one or more aspects of prior systems.

SUMMARY OF THE DISCLOSURE

According to one aspect of the present disclosure, a method of generating a secure image for a security document comprises the steps of providing a multi-color input image consisting of a plurality of pixels, and separating the multi-color (e.g. trichromatic) input image into a plurality of mono-color base images, each pixel in each base image having an intensity value between a minimum intensity value and a maximum intensity value. Each base image is divided into a plurality of cells, and at least two two-dimensional threshold functions are provided for each cell. The threshold functions do not intersect each other and define a plurality of intervals between the maximum intensity value and the minimum intensity value. A binary image is generated for each cell by comparing the intensity value of each pixel to the at least two threshold functions to determine an interval including the intensity value of the pixel, and setting the intensity value of each pixel to one of a first value and a second value associated with the interval. The first value and the second value are alternatingly associated with adjacent intervals. Finally, the secure image is generated by combining the binary images generated for the base images.

In another aspect, the present disclosure relates to a security document, for example, an ID card or a passport, comprising a secure image generated by the method of the above aspect.

In a further aspect, the present disclosure relates to a computer program comprising computer-executable instructions which, when executed by a computer, cause the computer to perform the steps of the method of the above aspect.

Other features and aspects of the present disclosure will be apparent from the following description and the accompanying drawings.

DETAILED DESCRIPTION

Figure 1:
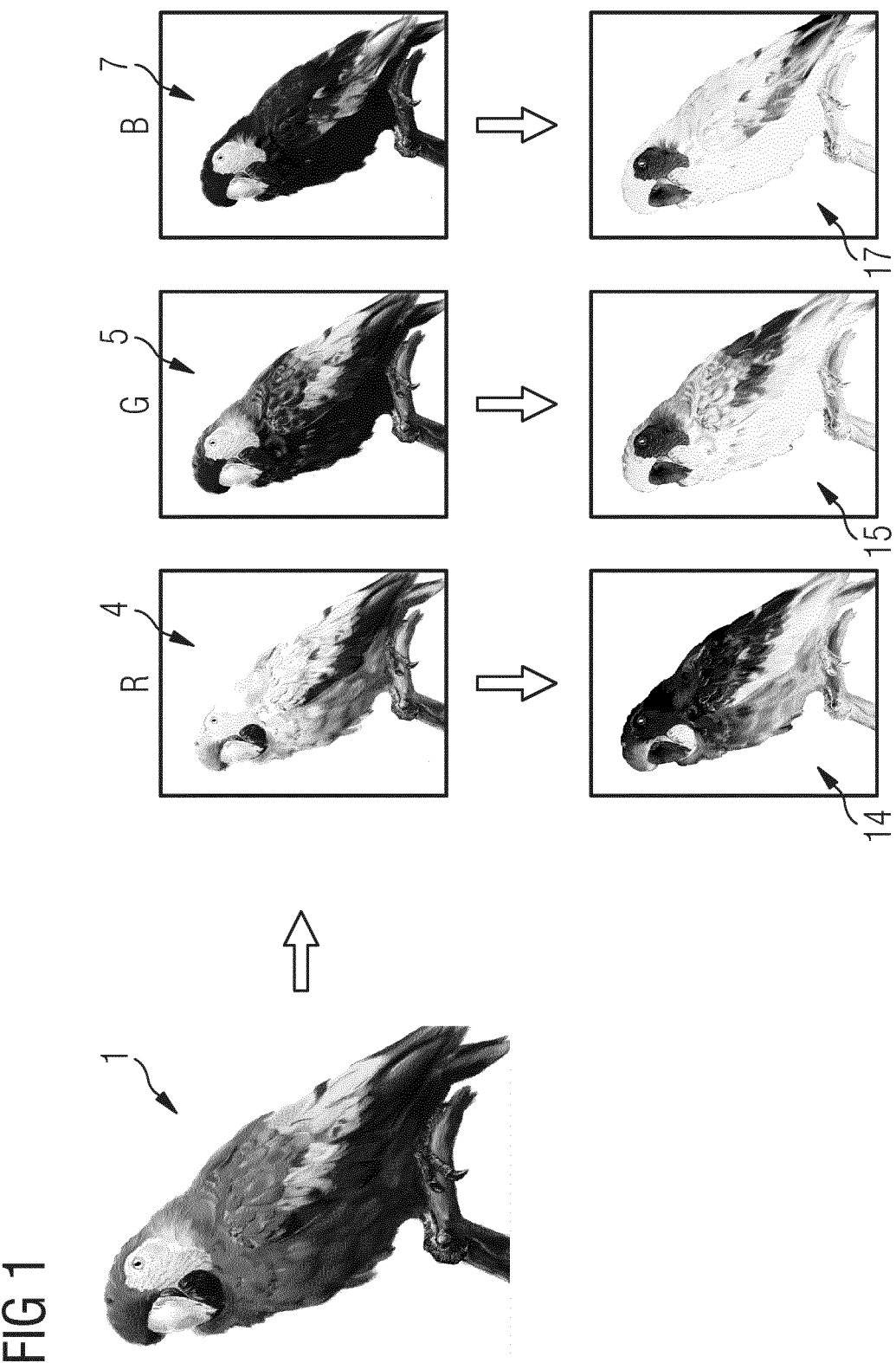
FIG. 1 is a schematic diagram showing a separation of a multi-color input image into a plurality of mono-color base images.

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of protection. Rather, the scope of protection shall be defined by the appended claims.

The present disclosure is based at least in part on the realization that a secure rasterization process suitable for offset printing and for relatively small images used in passport and ID card applications can be obtained by separating a fluorescent color image into mono-color base images, each of which is subjected to a rasterization process using at least two threshold functions. The threshold functions are applied to the original image in such a way that the original image gets first separated into channels representing the base colors. Advantageously, each channel gets inverted, and each inverted channel gets transferred into a binary image by means of the at least two non-identical threshold functions. The three resulting binary images can be printed on top of each other using fluorescent inks, for example, red, green and blue, resulting in a fluorescent color image which consists of a varying ornamental pattern and comprises a large number of different ornaments.

Further, it has been realized that, by using different threshold functions for different channels, a plurality of different, complex rasterization patterns can be obtained, which are present in the combined image. This makes it even harder to reproduce the rasterization pattern of the color image.

In addition, it has been realized that, by using at least two non-identical threshold functions, gradients of the input image can be reflected within one cell of the output rasterization. Therefore, the representation of details does not require a large number of cells, which supports images with relatively small dimensions, as is the case in ID card and passport applications. In particular, by using additional thresholds, the maximum gradient is not limited by the size of the raster cell, but remains relatively independent from the cell size.

The present disclosure is further based on the realization that, by using a plurality of threshold functions that are nested within each other, different intensity ranges can be addressed. For example, a first threshold function covers the full intensity range, while additional threshold functions cover smaller portions of the intensity range. As a result, the rasterization patterns specific to the individual threshold functions become effective only in their respective intensity ranges. This results in raster images, which show different raster shapes in different intensity ranges. Without having knowledge of the different threshold functions used to generate the image, it is highly difficult, if not impossible, to reproduce the different raster shapes. This greatly increases the security of the image.

In addition, it has been realized that, in order to avoid in image inversion, the distance between adjacent threshold functions should become larger the lower the intensity. This can be achieved, for example, by the outer threshold functions (covering the larger intensity ranges) have smaller gradients than the inner threshold functions covering the lower intensity regions.

An exemplary method of generating a secure image for a security document will be described in the following with reference to the drawings.

FIG. 1 shows a multi-color input image 1 consisting of a plurality of pixels, each pixel having a plurality of intensity values associated with a plurality of base colors, respectively. In a first step of processing the multi-color input image 1 (for example, a trichromatic image), a plurality of base component images 4, 5 and 7 are extracted from the multi-color input image 1. For example, as shown in FIG. 1, the red, green and blue components of a trichromatic input image can be extracted. This results in the plurality of base component images 4, 5, 7 having the same number of pixels as the multi-color input image 1. Each pixel of each base component image has an intensity value, for example, between zero and one. The separation of multi-color images into their base component images is well-known, such that a detailed description will be omitted. It will be immediately evident to the skilled person that the processes described above, as well as the processes described below, are performed using by software executed on an appropriate data processing device such as a computer having a CPU, a memory such as a RAM and a ROM, interfaces for peripheral devices, for example, printers and scanners, data communication devices, etc. As such, the methods disclosed herein are implemented using such known data processing devices (computers).

In some embodiments, as shown in FIG. 1, the base component images 4, 5, 7 are inverted to form a plurality of mono-color base images 14, 15, 17. For example, if an intensity value of a pixel in the red base component image 4 is x, the intensity value of the same pixel in the inverted image (i.e., the mono-color base image 14) is 1-x. The resulting mono-color base images 14, 15, 17 are shown in FIG. 1. It will be readily appreciated by the skilled person that, of course, in addition to the intensity values of each pixel, information identifying each of the mono-color base images 14, 15, 17 as, for example, the red, the green or the blue base image is also stored.

In the next step of the process, each of the mono-color base images 14, 15, 17 is subjected to a rasterization process, which will be described in the following in an exemplary manner for the red base image 14.

Figure 2:
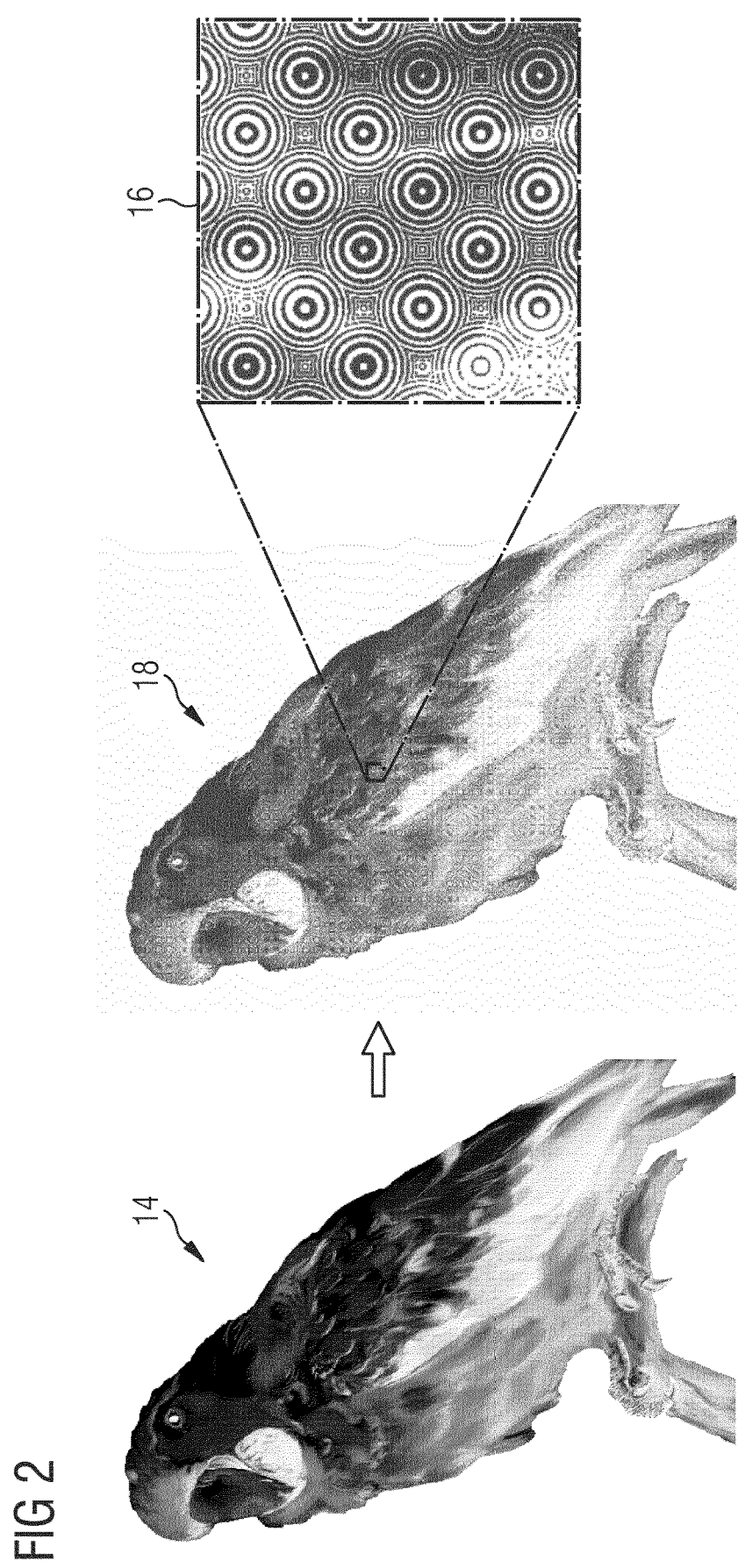
FIG. 2 shows an exemplary rasterization of a mono-color base image.

FIG. 2 shows the red base image 14. As previously mentioned, each pixel in the base image 14 has an intensity value $I(x, y)$ between a minimum intensity value $I_{min}$ and a maximum intensity value $I_{max}$ (for example, between 0 and 1). With the process disclosed herein, a rasterized binary image 18 is generated from the mono-color base image 14, as shown in FIG. 2. In particular, FIG. 2 shows one of a plurality of cells 16 into which the base image 14 is divided to perform the rasterization.

For each cell 16, a plurality of two-dimensional threshold functions $T_1(x, y), T_2(x, y), \ldots, T_n(x, y)$ are provided. The threshold functions do not intersect each other, and they define a plurality of intervals between $I_{max}$ and $I_{min}$. This is described in the following with respect to FIGS. 3 and 4.

Figure 3:
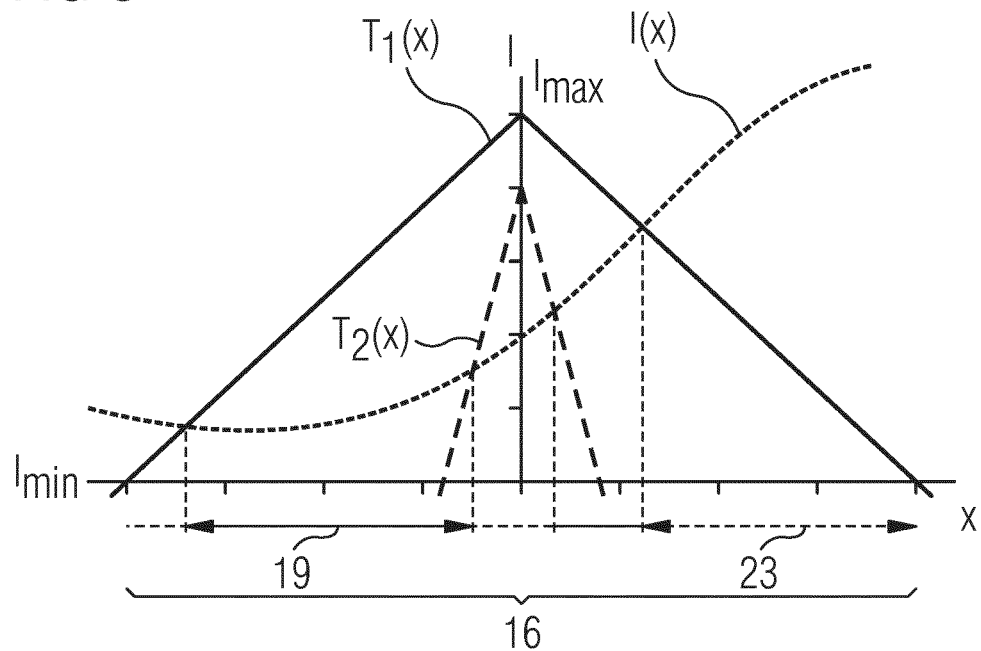
FIG. 3 shows an exemplary illustration of two threshold functions used in the disclosed method.

FIG. 3 shows a two-dimensional representation of two threshold functions $T_1(x)$ and $T_2(x)$. This is for the sake of illustration and to facilitate the understanding of the process. However, for example, two-dimensional threshold functions could easily be generated from the threshold functions shown in FIG. 3 by rotating the same around the vertical axis, resulting in two nested cones.

FIG. 3 also shows the varying intensity $I(x)$ of the pixels of the base image. In the example shown in FIG. 3, the two threshold functions $T_1(x)$ and $T_2(x)$ define three intervals between the maximum intensity $I_{max}$ and the minimum intensity $I_{min}$. The first interval is between $I_{max}$ and the upper threshold function $T_1(x)$, the second interval is between $T_1(x)$ and $T_2(x)$, and the third interval is between $T_2(x)$ and $I_{min}$. Based on this, each pixel with a given intensity value $I(x)$ can be associated with one of the three intervals. It is immediately obvious from this example that the intervals are solely defined by the maximum and minimum intensity values and the respective threshold functions. It is also evident that the threshold functions may, in some regions, have a functional value that is identical to the maximum intensity value or the minimum intensity value. However, for a given intensity value I(x), it will always be possible to determine the interval in which the intensity value lies (i.e., is it above the first threshold function, between the first and second threshold functions, or below the second threshold function). For example, even in regions where both threshold functions are zero, it would still be determined that any non-zero intensity value is above the first threshold function, i.e. in the interval defined by the maximum intensity value and the first threshold function. Likewise, intensity values I(x) having the maximum or minimum intensity can also be appropriately associated with the outer intervals (i.e. in the interval defined by the maximum intensity value and the first threshold function, and the interval defined by the second threshold function and the minimum intensity value, respectively).

Subsequently, the position of each pixel in cell 16 is determined, and the intensity value of said pixel is compared to the respective threshold functions to determine the interval in which it is included. Based on the determined interval, one of a first value and a second value is associated with the pixel as its new intensity value. In the example shown in FIG. 3, if a pixel is in the interval defined by $I_{max}$ and $T_1(x)$, i.e., its intensity value is greater than $T_1(x)$, the new pixel value becomes the first value. On the other hand, if the intensity value I(x) of a pixel lies between $T_1(x)$ and $T_2(x)$, its intensity value becomes the second value. The first value and the second value are alternatingly associated with adjacent intervals. Therefore, in the next interval between $T_2(x)$ and $I_{min}$, the pixel is again associated with the first value. In particular, to achieve a binary output image, the first value may be 1, and the second value may be 0. As a result, in the output binary image, there are regions 19, where the intensity values of the pixels are 0, and regions 23, where the intensity values of the pixels are 1. It will be readily appreciated that the sizes and shapes of the respective regions depend on the gradient of the intensities I(x) of the pixels in the base image, as well as the intensities of the same, and the shapes of the threshold functions.

Figure 4:
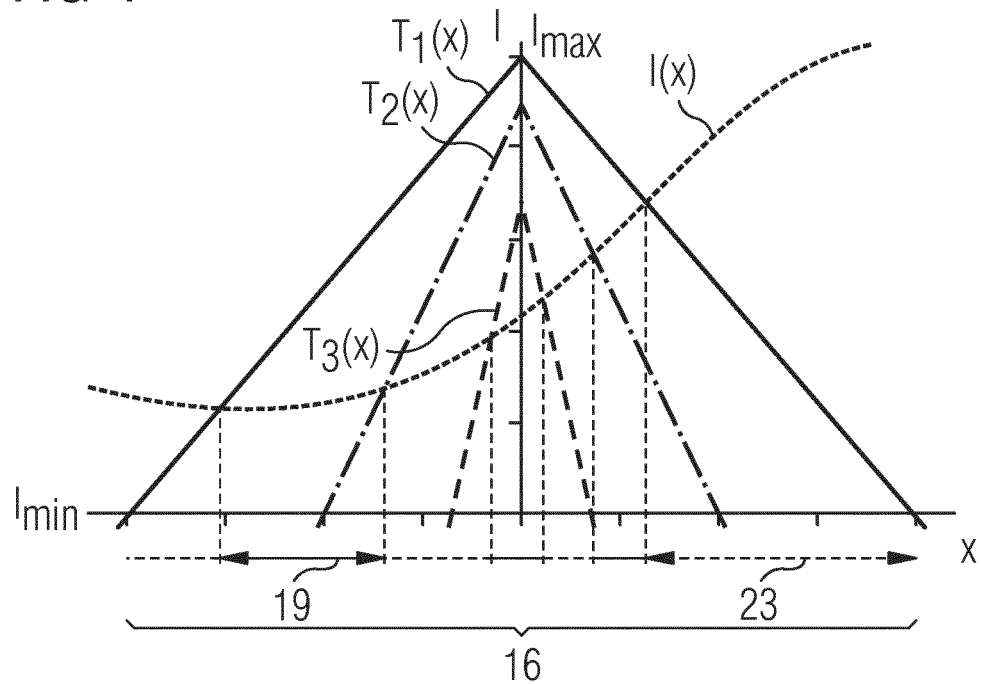
FIG. 4 shows an exemplary illustration of three threshold functions used in the disclosed method.

It will also be appreciated that the example with two threshold functions is not limiting, and any arbitrary number of threshold functions that do not intersect each other and define a plurality of intervals between $I_{max}$ and $I_{min}$ can be used. For example, FIG. 4 shows three threshold functions $T_1(x)$, $T_2(x)$ and $T_3(x)$. Again, the threshold functions are nested within each other, i.e., do not intersect each other. In addition, a distance between adjacent threshold functions in a direction perpendicular to the vertical axis becomes larger as the intensity becomes smaller. This is important in order to avoid an image inversion. In other words, as can be seen in FIG. 4, the size of the regions 19 associated with the second value, for example, 0, should become larger as the intensity decreases. In the example shown in FIG. 4, therefore, the gradients of the inner threshold functions become larger with respect to the gradients of the outer threshold functions covering the larger intensity ranges.

It will be appreciated that, although this is not shown in FIGS. 3 and 4, each threshold function is defined over the whole range of the cell 16, i.e. in the parts where the functions are not shown in the drawings, their value is set to the minimum intensity value $I_{min}$.

In the example shown in FIG. 4, it can be seen that, in case of three threshold functions, four intervals are defined between $I_{max}$ and $I_{min}$. Again, in the first interval between $I_{max}$ and $T_1(x)$, the intensity value of the corresponding pixels is set to 1. Likewise, in the subsequent intervals, the intensity values are alternatingly set to 0 and 1. Generally, it can be seen that n threshold functions result in n+1 intervals with alternating values.

In another way of describing the method of the present application, in case two threshold functions are used, as in FIG. 3, the binary image 18 is generated by setting the intensity value of each pixel to the first value in case $I(x, y) \geq T_1(x, y)$, setting the intensity value of each pixel to the second value in case $T_2(x, y) \leq I(x, y) < T_1(x, y)$, and setting the intensity value of each pixel to the first value in case $I(x, y) < T_2(x, y)$.

Likewise, in the example where three or more threshold functions are used, the binary image 18 is generated by setting the intensity value of each pixel to the first value when $I(x, y) \geq T_1(x, y)$, setting the intensity value of each pixel to the second value when $T_2(x, y) \leq I(x, y) \leq T_1(x, y)$, and setting the intensity value of each pixel to the first value when $T_3(x, y) \leq I(x, y) < T_2(x, y)$. In case no further threshold functions are present, the intensity value of each pixel is set to the second value when $I(x, y) < T_3(x, y)$. This corresponds to the case that is shown in FIG. 4.

Figure 5:
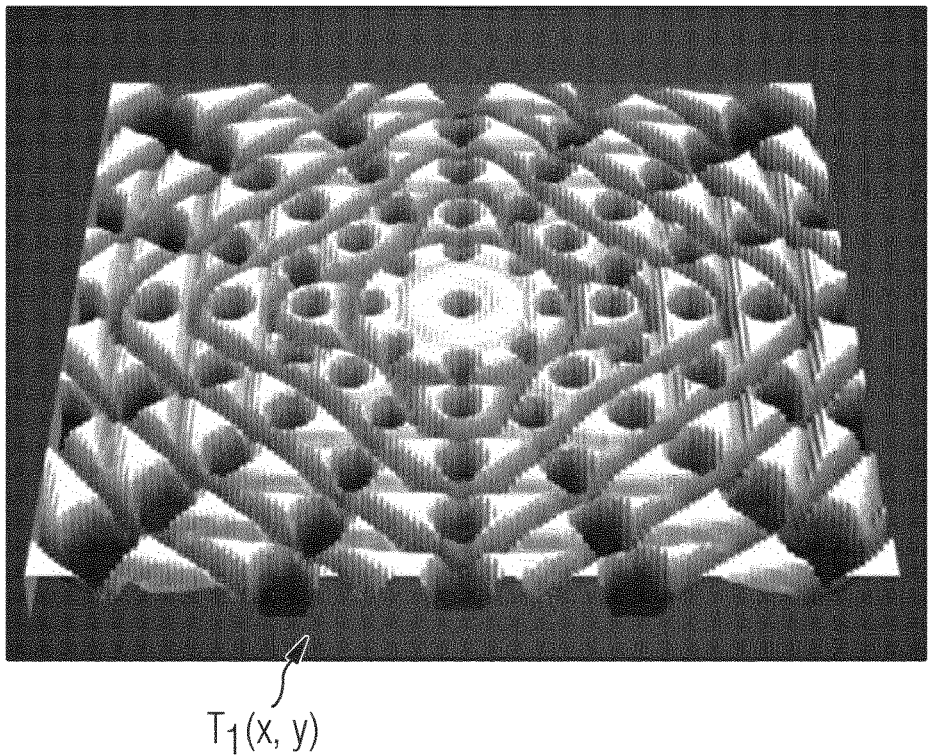
FIG. 5 shows a three-dimensional representation of a first threshold function.
Figure 6:
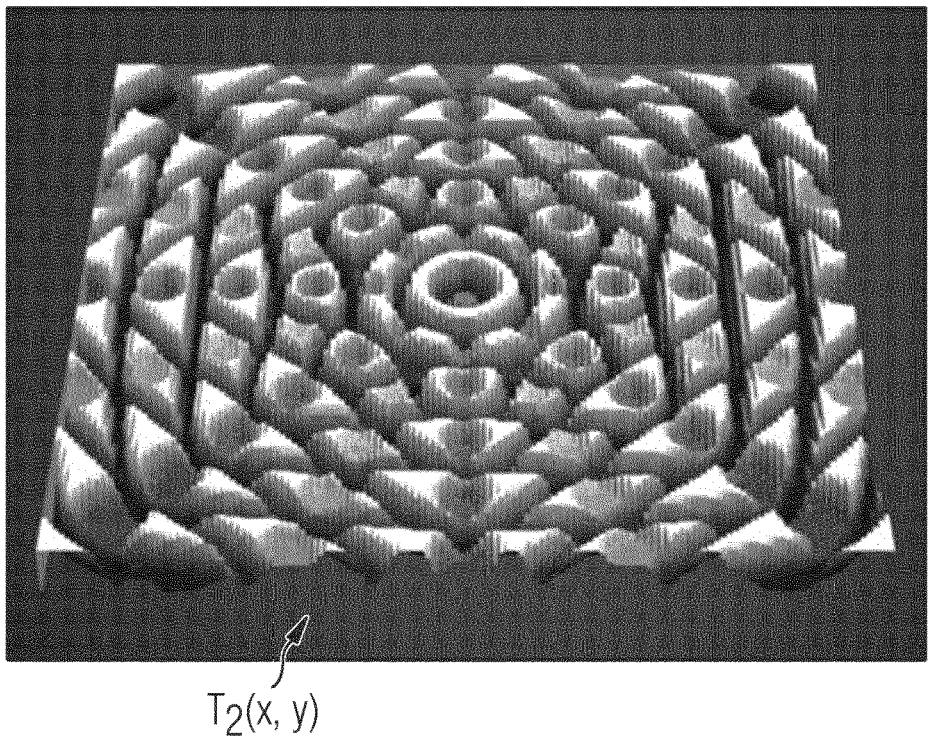
FIG. 6 shows a three-dimensional representation of a second threshold function.

It will be appreciated that the threshold functions shown in FIGS. 3 and 4 are only exemplary, and that any arbitrary complex shape can be used for the corresponding threshold functions, as long as they are nested, i.e., do not intersect each other and cover different intensity ranges. FIGS. 5 and 6 show two-dimensional threshold functions $T_1(x, y)$ and $T_2(x, y)$, where it can be seen that $T_1(x, y)$ covers the full intensity range, whereas $T_2(x, y)$ covers a lower intensity range, similar to the one-dimensional case shown in FIG. 3. In the example, the threshold functions each include a plurality of local maxima (and minima) at substantially the same positions, of course, with the maxima of $T_1(x, y)$ being greater than the maxima of $T_2(x, y)$. It is immediately evident to the skilled person that, if, for example, the threshold functions $T_1(x, y)$ and $T_2(x, y)$ shown in FIGS. 5 and 6 are applied to a base image such as the base image 14 shown in FIG. 2, a rasterization that is similar to the one that is shown in FIG. 2 can be obtained in each cell 16 and also for the entire binary image 18.

Figure 9:
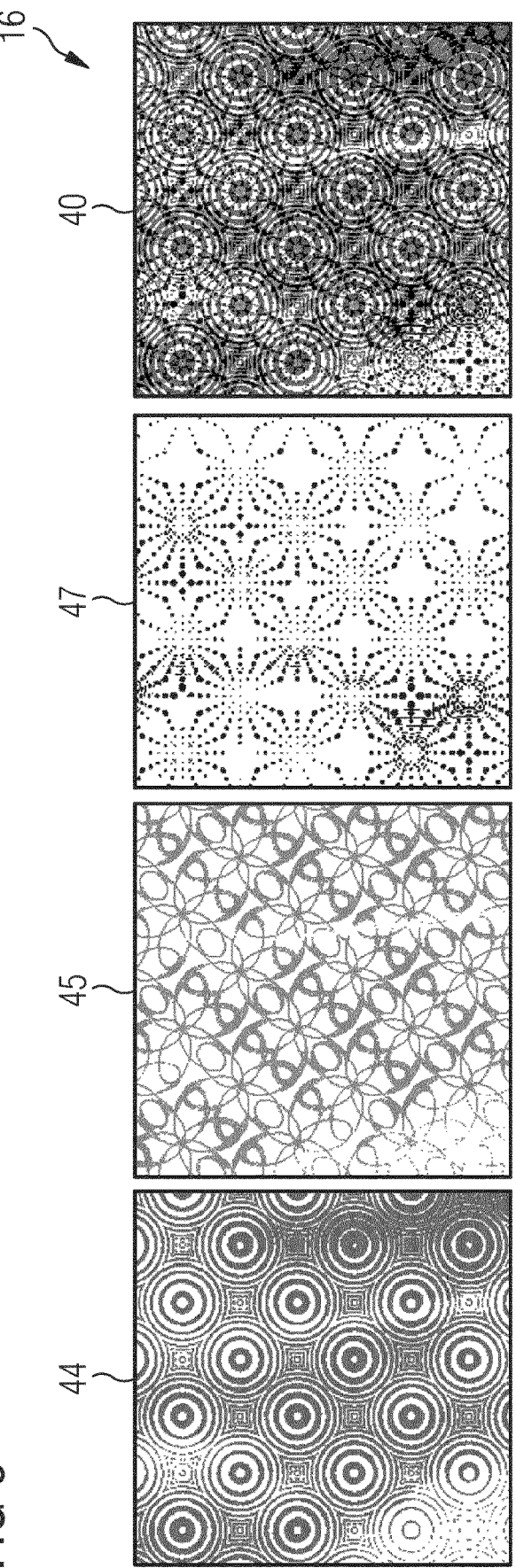
FIG. 9 shows an exemplary combination of different rasterizations resulting in a secure image.

The above process is repeated for the remaining monocolor base image 15 and 17, i.e., the green and blue components. In this respect, it is advantageous that the at least two two-dimensional threshold functions that are used for each base image are different from each other. In this manner, a different rasterization pattern can be generated for each color component. In other words, the binary images 18 obtained on the basis of the mono-color base images 15 and 17 can show a rasterization pattern that is different from the pattern that is shown in FIG. 2 (as will be discussed in more detail below with reference to FIG. 9).

After the binary images 18 have been obtained for all three base images 14, 15, 17, a secure image 10 can be generated by combining the binary images 18. Here, it will be appreciated that the color information associated with each binary image 18 will be used. An exemplary secure image 10 is shown, for example, in FIG. 8. As shown in detail in FIG. 9, the respective binary images each have a different rasterization pattern 44, 45 and 47, and are printed superimposed on each other to form a combined pattern 40 in each cell 16. In the example shown in FIG. 9, the red binary image has a red rasterization pattern 44, the green binary image has a green rasterization pattern 45, and the blue binary image has blue rasterization pattern 47. In the combined pattern 40, the three different color patterns are superimposed on each other. Due to the inversion carried out in the previous step, when the secure image 10 is printed with fluorescent inks, the images will have the correct colors when seen by the human eye. In other words, a person inspecting the secure image 10 will see an image that corresponds to the original multi-color input image 1 shown in FIG. 1.

In the above example, the at least two two-dimensional threshold functions are the same for each cell 18 of a given base image 14, 15, 17. However, in other embodiments, it is also contemplated that the at least two two-dimensional threshold functions are different for different cells 18 of a given base image. For example, a cell pattern could be used, and different threshold functions could be used for different cells of such a pattern (for example, a checkerboard pattern or the like). This can further increase the number of different rasterizations included in the output image.

Further, although it has been described that the threshold functions are different for each of the base images 14, 15, 17, in other embodiments, identical threshold functions could be used for two or more of the base images 14, 15, 17. Of course, this will result in a decreased security of the output image 10.

In other examples, the number of two-dimensional threshold functions used for different base images may be different. This also may allow for a further customization of the resulting rasterization patterns.

Although in the examples shown above, the threshold functions are symmetric with respect to a center of each cell 16, it will be understood that, in other embodiments, threshold functions that are not symmetric could be used. For example, a two-dimensional sawtooth function or the like could also be used.

In some embodiments, the binary images 18 are printed superimposed on each other by offset printing. In particular, the printing can be performed using different fluorescent inks respectively associated with the binary images 18. For example, a red, a green, and a blue fluorescent ink can be used.

INDUSTRIAL APPLICABILITY

As described above, with the teachings described herein, a secure image 10 for a security document such as a passport or an ID card can be generated, which allows for a complex rasterization pattern, more particularly, a plurality of complex rasterization patterns included in the secure image, which are difficult to recreate.

Figure 7:
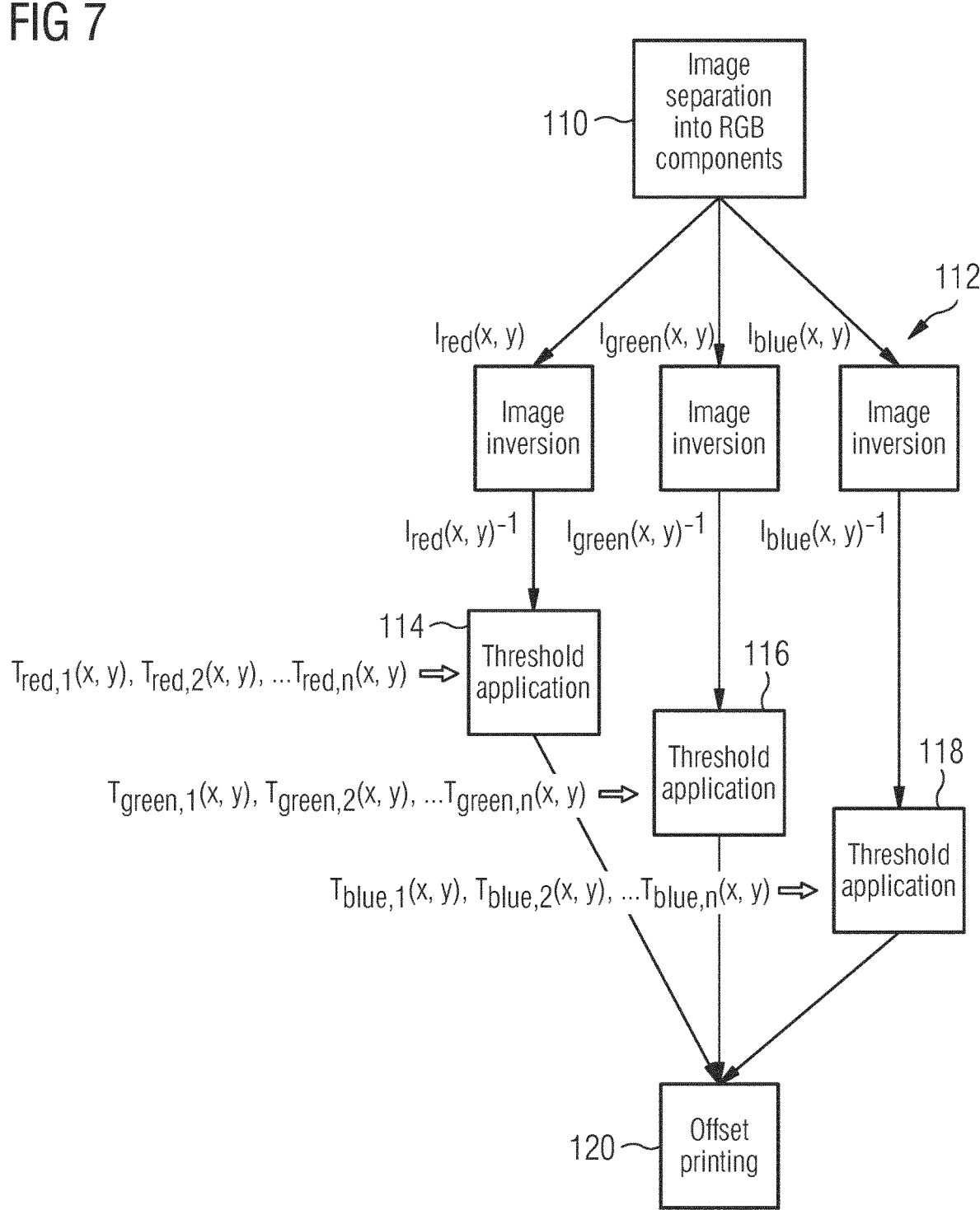
FIG. 7 shows an exemplary flow diagram in accordance with the present disclosure.

An exemplary method for forming the secure image 10 is described with respect to the flow chart shown in FIG. 7.

In step 110, a multi-color input image 1 is separated into a plurality of base component images 4, 5, 7, as shown in FIG. 1. Each base component image 4, 5, 7 has an associated intensity distribution for the pixels in the respective images ($I_{red}(x, y)$, $I_{green}(x, y)$, $I_{blue}(x, y)$).

In step 112, the plurality of base component images 4, 5, 7 are inverted, to obtain the plurality of mono-color base images 14, 15, 17 shown in FIG. 1. Each of the mono-color base images 14, 15, 17 has an inverted intensity distribution $I_{red}(x, y)^{-1}$, $I_{green}(x, y)^{-1}$, and $I_{blue}(x, y)^{-1}$.

In steps 114, 116 and 118, a plurality of threshold functions are applied to each mono-color base image. As shown in FIG. 7, n threshold functions can be used for each base image. The threshold functions have the properties described previously, and define n+1 intensity intervals between $I_{max}$ and $I_{min}$. As also mentioned above, the threshold functions are defined for each cell 16 of the corresponding base image. In the application of the threshold functions, each pixel of a cell 16 is associated with one of the intervals defined by the threshold functions, and, depending on its association with one of the intervals, the intensity value of the pixel is set to one of the first value and the second value, i.e., 1 or 0. The values are assigned in an alternating manner to subsequent intervals. As a result, three binary output images are obtained, similar to the binary image 18 shown for the red component in FIG. 2.

Figure 8:
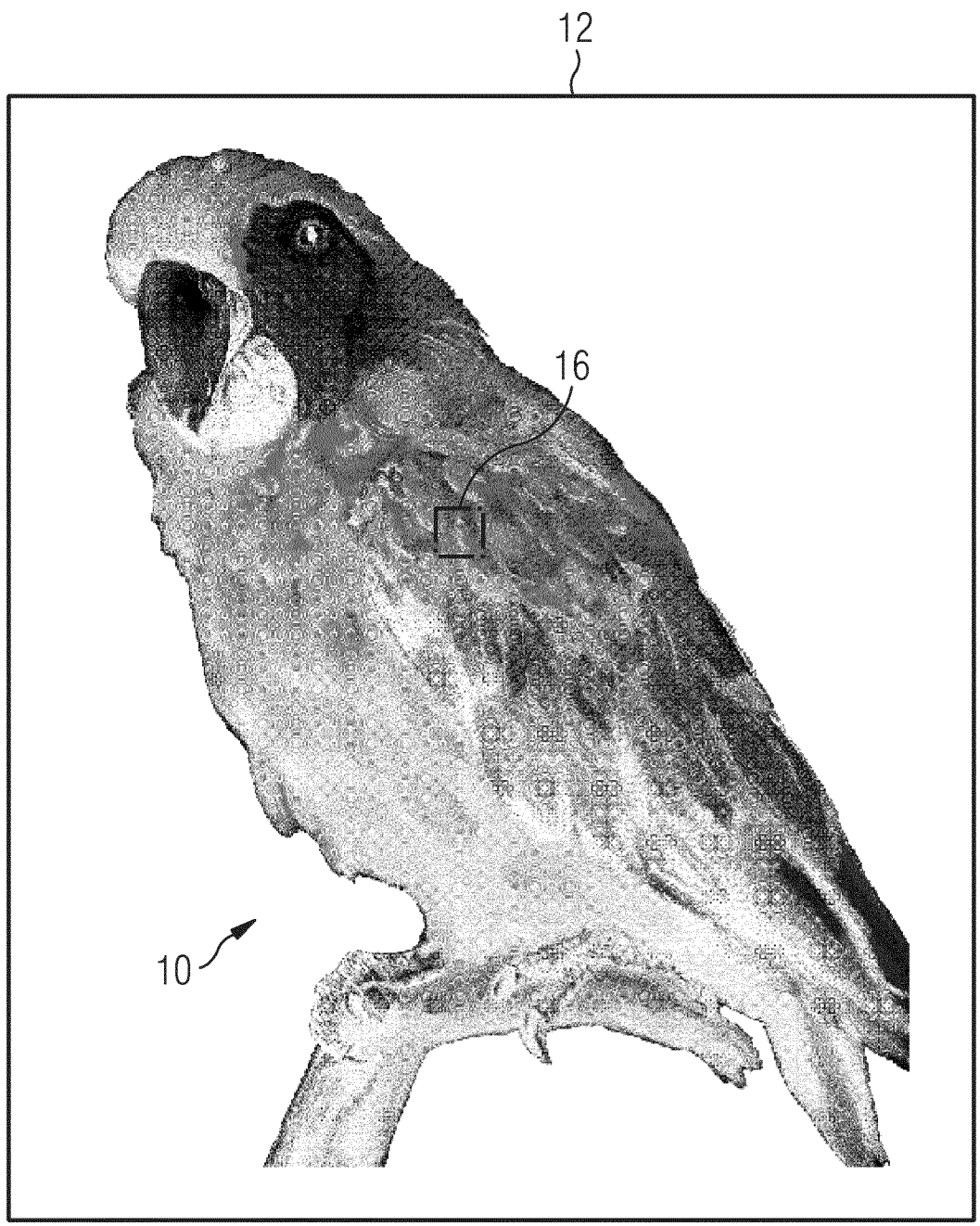
FIG. 8 shows a security document including a secure image generated with the method of the present disclosure.

In step 120, the three binary images 18 are combined, in particular, by offset printing the same using fluorescent inks of corresponding colors. At the end of the process, the secure image 10 shown in FIG. 8 is obtained, which may be included in a security document 12 such as a passport or an ID card. Here, it will be understood that the secure image does not necessarily have to be printed directly on the document 12, but can be printed on an inlay or layer forming the document 12.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the general disclosure.

Recitation of ranges of values herein are merely intended to serve as a shorthand method for referring individually to each separate value falling within the range, unless otherwise indicated herein, and each separate value is incorporated into the specification as if it were individually recited herein. All method steps described herein can be performed in any suitable order, unless otherwise indicated or clearly contradicted by the context.

Although the preferred embodiments of the present disclosure have been described herein, improvements and modifications may be incorporated without departing from the scope of the following claims.

The invention claimed is:

1. A non-transitory computer readable medium comprising executable code, that when executed by one or more processors, causes the one or more processors to:
    separate a multi-color input image comprising a plurality of pixels into a plurality of mono-color base images, each pixel in each base image having an intensity value $I(x, y)$ between a minimum intensity value $I_{min}$ and a maximum intensity value $I_{max}$;
    for each base image:
        divide the base image into a plurality of cells;
        provide at least two two-dimensional threshold functions $T_1(x, y)$, $T_2(x, y)$, ..., $T_n(x, y)$ for each cell, wherein the threshold functions do not intersect each other and define a plurality of intervals between $I_{max}$ and $I_{min}$, and
        generate a binary image by, for each cell:
            comparing the intensity value $I(x, y)$ of each pixel to the at least two threshold functions to determine an interval including the intensity value of the pixel; and
            setting the intensity value of each pixel to one of a first value or a second value associated with the interval, the first value and the second value being alternatingly associated with adjacent intervals; and
    generate the secure image by combining all the binary images generated for all the base images.

2. The non-transitory computer readable medium of claim 1, wherein setting the intensity value of each pixel comprises:

setting the intensity value of each pixel to the first value when $I(x, y) \geq T_1(x, y)$;

setting the intensity value of each pixel to the second value when $T_2(x, y) \leq I(x, y) < T_1(x, y)$; and setting the intensity value of each pixel to the first value when $I(x, y) < T_2(x, y)$.

3. The non-transitory computer readable medium of claim 1, wherein three two-dimensional threshold functions $T_1(x, y)$, $T_2(x, y)$, and $T_3(x, y)$ are provided, and setting the intensity value of each pixel comprises:

setting the intensity value of each pixel to the first value when $I(x, y) \geq T_1(x, y)$;

setting the intensity value of each pixel to the second value when $T_2(x, y) \leq I(x, y) < T_1(x, y)$; and setting the intensity value of each pixel to the first value when $T_3(x, y) \leq I(x, y) < T_2(x, y)$.

4. The non-transitory computer readable medium of claim 3, wherein setting the intensity value of each pixel further comprises setting the intensity value of each pixel to the second value when $I(x, y) < T_3(x, y)$.

5. The non-transitory computer readable medium of claim 1, wherein, in a three-dimensional plot of the plurality of two-dimensional threshold functions, a distance between adjacent two-dimensional threshold functions in a direction perpendicular to the z-axis becomes larger as z becomes smaller.

6. The non-transitory computer readable medium of claim 1, wherein the at least two two-dimensional threshold functions are the same for each cell of a given base image.

7. The non-transitory computer readable medium of claim 1, wherein the at least two two-dimensional threshold functions are different for different cells of a given base image.

8. The non-transitory computer readable medium of claim 1, wherein the at least two two-dimensional threshold functions are different for each of the base images.

9. The non-transitory computer readable medium of claim 1, wherein a number of two-dimensional threshold functions used for different base images is different.

10. The non-transitory computer readable medium of claim 1, wherein at least one of:

the at least two two-dimensional threshold functions are symmetric with respect to a center of each cell; or the at least two two-dimensional threshold functions each include a plurality of local maxima at same positions.

11. The non-transitory computer readable medium of claim 1, wherein the executable code, when executed by the one or more processors, causes the one or more processors to further form the mono-color base images by inverting base component images of the multi-color input image.

12. The non-transitory computer readable medium of claim 1, wherein the first value is 1 and the second value is 0.

13. The non-transitory computer readable medium of claim 1, wherein generating the secure image comprises printing the binary images superimposed on each other.

14. The non-transitory computer readable medium of claim 13, wherein printing the binary images superimposed on each other comprises printing the binary images by offset printing using different fluorescent inks respectively associated with the binary images.

15. A method of generating a secure image for a security document, the method comprising:

separating a multi-color input image comprising a plurality of pixels into a plurality of mono-color base images, each pixel in each base image having an intensity value $I(x, y)$ between a minimum intensity value $I_{min}$ and a maximum intensity value $I_{max}$;

for each base image:
dividing the base image into a plurality of cells;
providing at least two two-dimensional threshold functions $T_1(x, y)$, $T_2(x, y)$, ..., $T_n(x, y)$ for each cell, wherein the threshold functions do not intersect each other and define a plurality of intervals between $I_{max}$ and $I_{min}$; and
generating a binary image by, for each cell:
comparing the intensity value $I(x, y)$ of each pixel to the at least two threshold functions to determine an interval including the intensity value of the pixel; and
setting the intensity value of each pixel to one of a first value or a second value associated with the interval, the first value and the second value being alternatingly associated with adjacent intervals; and generating the secure image by combining all the binary images generated for all the base images.

16. The method of claim 15, wherein, in a three-dimensional plot of the plurality of two-dimensional threshold functions, a distance between adjacent two-dimensional threshold functions in a direction perpendicular to the z-axis becomes larger as z becomes smaller.

17. The method of claim 15, wherein the at least two two-dimensional threshold functions are different for each of the base images.

18. The method of claim 15, wherein the first value is 1 and the second value is 0.

19. A security document comprising a security image generated by a method comprising:

separating a multi-color input image comprising a plurality of pixels into a plurality of mono-color base images, each pixel in each base image having an intensity value $I(x, y)$ between a minimum intensity value $I_{min}$ and a maximum intensity value $I_{max}$;

for each base image:
dividing the base image into a plurality of cells;
providing at least two two-dimensional threshold functions $T_1(x, y)$, $T_2(x, y)$, ..., $T_n(x, y)$ for each cell, wherein the threshold functions do not intersect each other and define a plurality of intervals between $I_{max}$ and $I_{min}$; and
generating a binary image by, for each cell:
comparing the intensity value $I(x, y)$ of each pixel to the at least two threshold functions to determine an interval including the intensity value of the pixel; and
setting the intensity value of each pixel to one of a first value or a second value associated with the interval, the first value and the second value being alternatingly associated with adjacent intervals; and generating the secure image by combining all the binary images generated for all the base images.

20. The security document of claim 19, wherein the security document is an ID card or a passport.

* * * * *